US011528857B2

(12) United States Patent
Shen et al.

(10) Patent No.: US 11,528,857 B2
(45) Date of Patent: Dec. 20, 2022

(54) METHOD FOR REMEDYING SANDY LAND BY USING SIMULATED LOAM SUBSTRATE SPRAY-SEEDING TECHNOLOGY

(71) Applicant: Jiangsu Lvyan Ecological Technology Co., Ltd., Jiangsu (CN)

(72) Inventors: Yifeng Shen, Jiangsu (CN); Yuqian Zhang, Jiangsu (CN); Bo Zhang, Jiangsu (CN)

(73) Assignee: Jiangsu Lvyan Ecological Technology Co., Ltd., Jiangsu (CN)

( * ) Notice: Subject to any disclaimer, the term of this patent is extended or adjusted under 35 U.S.C. 154(b) by 693 days.

(21) Appl. No.: 16/496,172

(22) PCT Filed: Apr. 19, 2019

(86) PCT No.: PCT/CN2019/083438
§ 371 (c)(1),
(2) Date: Sep. 20, 2019

(87) PCT Pub. No.: WO2020/034655
PCT Pub. Date: Feb. 20, 2020

(65) Prior Publication Data
US 2021/0219484 A1 Jul. 22, 2021

(30) Foreign Application Priority Data
Aug. 15, 2018 (CN) .......................... 201810929998.1

(51) Int. Cl.
*A01G 24/00* (2018.01)
*A01C 21/00* (2006.01)
*E02D 3/00* (2006.01)

(52) U.S. Cl.
CPC .............. *A01G 24/00* (2018.02); *A01C 21/00* (2013.01); *E02D 3/00* (2013.01)

(58) Field of Classification Search
CPC ...... A01G 24/00; A01G 17/005; A01G 20/00; A01G 24/10; A01G 24/20; A01G 24/22; A01G 24/28; A01B 79/02; A01C 21/00; A01C 7/004; A01C 1/00; A01C 1/06; A01C 7/00; A01C 7/008
See application file for complete search history.

(56) References Cited

FOREIGN PATENT DOCUMENTS

| | | | |
|---|---|---|---|
| CN | 1414185 A | | 4/2003 |
| CN | 204418191 U | | 6/2015 |
| CN | 107251729 A | | 10/2017 |
| CN | 107750746 A | | 3/2018 |
| CN | 107760746 A | * | 3/2018 |
| JP | 1146584 A | | 2/1999 |

OTHER PUBLICATIONS

International Search Report dated Jun. 28, 2019; International Application No. PCT/CN2019/083438; International Filing Date: Apr. 19, 2019; 5 pages.
English translation of China Published Application No. CN107750746; Publication Date: Mar. 6, 2018; 26 pages.
English translation of China Published Application No. CN107251729; Publication Date: Oct. 17, 2017; 13 pages.
English translation of China Published Application No. CN1414185; Publication Date: Apr. 30, 2003; 6 pages.
English translation of China Published Application No. CN204418191; Publication Date: Jun. 24, 2015; 6 pages.
English translation of Japan Published Application No. JPH1146584; Publication Date: Feb. 23, 1999; 6 pages.

* cited by examiner

*Primary Examiner* — Christopher D Hutchens
*Assistant Examiner* — Nicole Paige Maccrate
(74) *Attorney, Agent, or Firm* — Blank Rome LLP

(57) ABSTRACT

A method for remedying sandy land by using a simulated loam substrate spray-seeding technology includes: first, carrying out a sand-fixing treatment to lay a metal mesh in sandy land, the metal mesh being fixed to the surface of the sandy land by a sand-fixing pile; second, spray-seeding a seed into the sandy land by simulated loam substrate spray-seeding; and finally, after spray-seeding, carrying out maintenance management, including adding a protective plate around the metal mesh, covering with a non-woven fabric, watering, fertilizing, reseeding, and post-monitoring. The present invention adopts a two-layer spray-seeding method, and rapidly simulates a loam substrate suitable for plant growth by bionics; the simulated loam substrate having good water retention capacity (conducive to a higher germination rate of seed), root development, microbial activity, nutrient transformation, and plant growth and development. With less investment and having a quick effect, large-scale sand control is provided.

7 Claims, No Drawings

METHOD FOR REMEDYING SANDY LAND BY USING SIMULATED LOAM SUBSTRATE SPRAY-SEEDING TECHNOLOGY

RELATED APPLICATIONS

This application is a U.S. national phase application of International Application No. PCT/CN2019/083438, filed Apr. 19, 2019; which application claims benefit of priority of Chinese Patent Application No. CN201810929998.1, filed with the State Intellectual Property Office on Aug. 15, 2018, and entitled "METHOD FOR REMEDYING SANDY LAND BY USING SIMULATED LOAM SUBSTRATE SPRAY-SEEDING TECHNOLOGY". Each of the above-identified related applications are incorporated herein by reference in their entirety.

FIELD OF USE

Technical Field

The present invention relates to the technical field of desertification control, and in particular, to a method for remedying sandy land by using a simulated loam substrate spray-seeding technology.

Background of the Invention

There are a large number of deserts all over the world, and the deserts are expanding rapidly. The frequency of sandstorms is getting higher and higher, and the harm caused by them is getting bigger and bigger. Although the society is paying more and more attention to prevention and control of desertification, it also consumes a lot of financial and material resources, and in general, the speed of control still cannot keep up with the speed of desertification, the trend of local improvement but overall deterioration is still continuing, and the situation that desert advances and man retreats has not been fundamentally changed.

In prevention and control of desertification, a mechanical sand barrier is an important sand-fixing measure, which is laid relatively fast, and has a good wind prevention and sand fixation effect. However, it also has many shortcomings such as inconvenient transportation and relatively high costs of layout and management. In addition, the mechanical sand barrier does not have significant ecological and economic benefits, which is not conducive to long-term stable ecological restoration and ecological planning. Compared with the mechanical sand barrier, desert bio-mulching is a sustainable measure for prevention and control of desertification. It can stably exert ecological and economic benefits of a plant for a long term, and accelerate regional ecological restoration.

At present, a desert bio-mulching method is often to plant a shrub plant in a strip pattern. The planting species generally include such desert shrubs as calligonum klementizii, haloxylon ammodendron, and salix psammophila. They require regular irrigation and protection as sand dunes have a migratory surface and a low water content, resulting in high investment of manpower and cost. Moreover, these plants have slow growth and a low survival rate, and cannot quickly form a wind prevention and sand fixation effect.

SUMMARY OF THE INVENTION

An objective of the present invention is to provide a method for remedying sandy land by using a simulated loam substrate spray-seeding technology, to overcome the shortcomings of the prior art.

To achieve the above purpose, the present invention provides the following technical solution.

A method for remedying sandy land by using a simulated loam substrate spray-seeding technology includes the following steps: first, carrying out a simple sand-fixing treatment to lay a metal mesh in sandy land, the metal mesh being fixed to the surface of the sandy land by a sand-fixing pile;

second, spray-seeding a seed into the sandy land by means of simulated loam substrate spray-seeding, including:

A. mixing a simulated loam substrate agent with a part of a substrate material in proportion, and stirring evenly to form a first simulated loam substrate mixture; sending the first simulated loam substrate mixture to a spray nozzle by using a spray pump; adding water to the spray nozzle to mix with the first simulated loam substrate mixture, and then spraying onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, laying a plurality of water pipes in parallel at intervals on the surface of the first simulated loam substrate mixture, the water pipes being provided with a water hole;

C. mixing the simulated loam substrate agent with a part of the substrate material and a plant seed in proportion, and stirring evenly to form a second simulated loam substrate mixture; sending the second simulated loam substrate mixture to the spray nozzle by the spray pump for secondary spray, the seed having been germinated;

D. when the average thickness of the two simulated loam substrate mixtures sprayed onto the sandy land is 12-16 cm, finishing the spraying;

finally, when the spray-seeding is completed, carrying out maintenance management, including adding a protective plate around the metal mesh, covering with a non-woven fabric, watering, fertilizing, reseeding, and post-monitoring.

Preferably, the first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed.

Preferably, the first simulated loam substrate mixture has a thickness of 7-8 cm.

Preferably, the plant seed in the second simulated loam substrate mixture is a seed of an herbaceous plant, a desert shrub plant or a nitrogen-fixing plant.

Preferably, the water pipes are connected to a reservoir or an irrigation system.

Preferably, the reseeding is carried out in 5-15 days after the spray-seeding is finished, and the plant seed is soaked for germination 48-72 hours before reseeding.

Beneficial Effects: The method for remedying sandy land by using a simulated loam substrate spray-seeding technology provided by the present invention adopts a two-layer spray-seeding method, and rapidly simulates a simulated loam substrate suitable for plant growth in natural world by bionics; the simulated loam substrate has a good water retention capacity, which is conducive to a higher germination rate of a seed, root development, a microbial activity, nutrient transformation, and plant growth and development; and with less investment and a quick effect, the method is suitable for large-scale sand control.

DETAILED DESCRIPTION

The following describes the present invention in more detail below with reference to embodiments.

Embodiment 1

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed.

The first simulated loam substrate mixture has a thickness of 7-8 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 2

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is decomposed chicken manure, having ≤20 wt % of water content; the straw fiber is a rice straw fiber; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is a natural polymer modified super absorbent resin; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 7-8 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 3

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is decomposed chicken and pig manure, having ≤20 wt % of water content; the straw fiber is a rice straw fiber; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is a natural polymer modified super absorbent resin and humic acid; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 4-6 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 4

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is decomposed pig manure, having ≤20 wt % of water content; the straw fiber is rice chaff; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is humic acid; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 7-8 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 5

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is decomposed pig manure, having ≤20 wt % of water content; the straw fiber is decomposed sawdust of a broad-leaved tree; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is a natural polymer modified super absorbent resin; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 4 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 6

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is decomposed chicken manure, having ≤20 wt % of water content; the straw fiber is rice chaff; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is humic acid; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 5 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Embodiment 7

A method for remedying sandy land by using a simulated loam substrate spray-seeding technology, including the following steps:

first, carry out a simple sand-fixing treatment to lay a metal mesh in sandy land, the metal mesh being fixed to the surface of the sandy land by a sand-fixing pile;

second, spray-seed a seed into the sandy land by means of simulated loam substrate spray-seeding, including A. mix a simulated loam substrate agent with a part of a substrate material in proportion, and stir evenly to form a first simulated loam substrate mixture; send the first simulated loam substrate mixture to a spray nozzle by using a spray pump; add water to the spray nozzle to mix with the first simulated loam substrate mixture, and then spray onto the metal mesh, water consumption being controlled so that the first simulated loam substrate mixture sprayed onto the metal mesh in the sandy land is viscous and stable without flowing around;

B. when the first simulated loam substrate mixture of first spray reaches a certain thickness, lay a plurality of water pipes in parallel at intervals on the surface of the first simulated loam substrate mixture, the water pipes being provided with a water hole;

C. mix the simulated loam substrate agent with a part of the substrate material and a plant seed in proportion, and stir evenly to form a second simulated loam substrate mixture; send the second simulated loam substrate mixture to the spray nozzle by the spray pump for secondary spray, the seed having been germinated;

D. when the average thickness of the two simulated loam substrate mixtures sprayed onto the sandy land is 12-16 cm, finish the spraying;

finally, when the spray-seeding is completed, carry out maintenance management, including adding a protective plate around the metal mesh, covering with a non-woven fabric, watering, fertilizing, reseeding, and post-monitoring.

The first simulated loam substrate mixture includes the following components in proportion: 58% of soil, 11% of peat, 1.5% of curing agent, 7% of organic fertilizer, 14% of straw fiber, 0.1% of trace element, 1.3% of diluted fertilizer, 2.1% of water retention agent, and 5% of simulated loam substrate agent; the second simulated loam substrate mixture includes the following components in proportion: 62% of soil, 10% of peat, 7% of mineral, 2% of curing agent, 10% of straw fiber, 0.1% of trace element, 1.3% of diluted fertilizer, 1.6% of water retention agent, 5% of simulated loam substrate agent, and 1% of plant seed; the curing agent is an environmentally-friendly adhesive; the organic fertilizer is pig manure, having ≤20 wt % of water content; the straw fiber is a rice straw fiber; the trace element includes ≥20 wt % of CaO, ≥5 wt % of MgO, and ≥4 wt % of $P_2O_5$; the diluted fertilizer has ≥14 wt % of potassium oxide content, and 20% of total nitrogen content; the water retention agent is a natural polymer modified super absorbent resin; raw materials for the preparation of the simulated loam substrate agent include a soil conditioner, maifanite and activated carbon; the mineral includes ≥26 wt % of $SiO_2$, ≥20 wt % of pure boron content, and ≥25 wt % willemite.

The first simulated loam substrate mixture has a thickness of 6 cm.

The plant seed in the second simulated loam substrate mixture is a seed of an herbaceous plant, a desert shrub plant or a nitrogen-fixing plant.

The water pipes are connected to a reservoir or an irrigation system.

The reseeding is carried out in 5-15 days after the spray-seeding is finished, and the plant seed is soaked for germination 48-72 hours before reseeding.

Experimental Example

The germination rate of the seeds in Embodiments 1 to 7 was measured, and the germination rate was 98% or more.

The present invention adopted a two-layer spray-seeding method, and rapidly simulated a simulated loam substrate suitable for plant growth in natural world by bionics; under the action of a strong light, strong transpiration and a strong wind, a substrate layer could reduce a surface fracture of the substrate through surface tension to minimize water loss; at night, when air humidity was 20% or more, a surface layer of the substrate could absorb the air humidity and stored it in sandy loam under a bottom layer of the substrate, and dew on vegetation could also be stored in the substrate; the substrate had a good water retention capacity, which was conducive to increasing the germination rate of the seeds, making the germination rate reach 98% or above. It indicates that the sandy land remediation method provided by the present invention is conducive to root development, a microbial activity, nutrient transformation, and plant growth and development; and with less investment and a quick effect, the method is suitable for large-scale sand control.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for remedying sandy land by using a simulated loam substrate spray-seeding technology, comprising the following steps: first, carrying out a sand-fixing treatment to lay a metal mesh in sandy land, the metal mesh being fixed to the surface of the sandy land by a sand-fixing pile; second, spray-seeding a seed into the sandy land by means of simulated loam substrate spray-seeding, comprising:
- (a) mixing a simulated loam substrate agent with a part of a substrate material in proportion, and stirring evenly to form a first simulated loam substrate mixture; sending the first simulated loam substrate mixture to a spray nozzle by using a spray pump; adding water to the spray nozzle to mix with the first simulated loam substrate mixture, and then spraying onto the metal mesh, water consumption being controlled so that the first simulated loam substrate mixture sprayed onto the metal mesh in the sandy land is not flowing around;
- (b) when the first simulated loam substrate mixture of the spraying of step (a) reaches a certain thickness, laying a plurality of water pipes in parallel at intervals on the surface of the first simulated loam substrate mixture, the water pipes being provided with a water hole;
- (c) mixing the simulated loam substrate agent with a part of the substrate material and a plant seed in proportion, and stirring evenly to form a second simulated loam substrate mixture; sending the second simulated loam substrate mixture to the spray nozzle by the spray pump for secondary spray, the plant seed having been germinated;
- (d) when the average thickness of the two simulated loam substrate mixtures sprayed onto the sandy land is 12-16 cm, finishing the spraying;

finally, when the spray-seeding is completed, carrying out maintenance management, comprising adding a protective plate around the metal mesh, covering with a non-woven fabric, watering, fertilizing, reseeding, and post-monitoring;

wherein raw materials for preparation of the simulated loam substrate agent comprise a soil conditioner, maifanite and activated carbon; and wherein the part of the substrate material comprises soil, peat, a curing agent, organic fertilizer, a straw fiber, a trace element, diluted fertilizer and a water retention agent.

2. The method for remedying sandy land by using a simulated loam substrate spray-seeding technology according to claim 1, wherein the first simulated loam substrate mixture comprises the part of the substrate material in the following proportion: 58% of soil, 11% of peat, 1.5% of curing agent, 7% of organic fertilizer, 14% of straw fiber, 0.1% of trace element, 1.3% of diluted fertilizer, and 2.1% of water retention agent, with the remaining 5% of the first simulated loam substrate mixture being the simulated loam substrate agent; and wherein the second simulated loam substrate mixture comprises the part of the substrate material in the following proportion: 62% of soil, 10% of peat, 7% of mineral, 2% of curing agent, 10% of straw fiber, 0.1% of trace element, 1.3% of diluted fertilizer, and 1.6% of water retention agent, with 5% of the second simulated loam substrate mixture being the simulated loam substrate agent, and 1% being plant seed.

3. The method for remedying sandy land by using a simulated loam substrate spray-seeding technology according to claim 2, wherein the plant seed in the second simulated loam substrate mixture is a seed of an herbaceous plant, a desert shrub plant or a nitrogen-fixing plant.

4. The method for remedying sandy land by using a simulated loam substrate spray-seeding technology according to claim 1, wherein the first simulated loam substrate mixture has a thickness of 7-8 cm.

5. The method for remedying sandy land by using a simulated loam substrate spray-seeding technology according to claim 1, wherein the plant seed in the second simulated loam substrate mixture is a seed of an herbaceous plant, a desert shrub plant or a nitrogen-fixing plant.

6. The method for remedying sandy land by using a simulated loam substrate spray-seeding technology according to claim 1, wherein the water pipes are connected to a reservoir or an irrigation system.

7. The method for remedying sandy land by using a simulated loam substrate spray-seeding technology according to claim 1, wherein the reseeding is carried out in 5-15 days after the spray-seeding is finished, and the plant seed is soaked for germination 48-72 hours before reseeding.

* * * * *